(12) United States Patent
Bertagna (10) Patent No.: US 6,862,280 B1
(45) Date of Patent: Mar. 1, 2005

(54) PRIORITY REMAPPING FOR DATA COMMUNICATION SWITCH

(75) Inventor: Drew Bertagna, Oak Park, CA (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/516,859

(22) Filed: Mar. 2, 2000

(51) Int. Cl.[7] .............................................. H04L 12/56
(52) U.S. Cl. ...................................... 370/392; 370/401
(58) Field of Search ................................. 370/389, 392, 370/400, 401, 409, 474, 395.1, 395.53, 428, 429; 711/202, 203, 206, 216

(56) References Cited

U.S. PATENT DOCUMENTS

| | | | |
|---|---|---|---|
| 5,872,783 A | * 2/1999 | Chin | 370/395.32 |
| 5,999,536 A | * 12/1999 | Kawafuji et al. | 370/401 |
| 6,111,874 A | * 8/2000 | Kerstein | 370/389 |
| 6,181,699 B1 | * 1/2001 | Crinion et al. | 370/392 |
| 6,252,888 B1 | * 6/2001 | Fite et al. | 370/466 |
| 6,460,088 B1 | * 10/2002 | Merchant | 709/236 |
| 6,515,993 B1 | * 2/2003 | Williams et al. | 370/395.53 |
| 6,526,052 B1 | * 2/2003 | Rijhsinghani et al. | 370/389 |

FOREIGN PATENT DOCUMENTS

| | | |
|---|---|---|
| WO | WO 00/03256 | 1/2000 |
| WO | WO 00/56024 | 9/2000 |

* cited by examiner

*Primary Examiner*—Chau Nguyen
*Assistant Examiner*—Duc Duong
(74) *Attorney, Agent, or Firm*—Michael Blaine Brooks PC; Craig A. Hoersten; V. Lawrence Sewell (57) ABSTRACT

Priority processing for a data communication switch, such as a LAN switch supporting source-learned bridging, in which a priority value for application to an outbound tagged packet is determined based on an inbound tag priority and a plurality of other values, such as an inbound tag VLAN and receiving port identifier. The plurality of other values may be initially resolved to a virtual trunk identifier, which virtual trunk identifier may be applied with the inbound tag priority to determine the outbound tag priority. The virtual trunk identifier may be resolved by reducing the plurality of other values to a smaller-bit value and using the smaller-bit value in a table look-up.

11 Claims, 9 Drawing Sheets

| | [7:0] |
|---|---|
| 0 | DA0 |
| 1 | DA1 |
| 2 | DA2 |
| 3 | DA3 |
| 4 | DA4 |
| 5 | DA5 |
| 6 | SA0 |
| 7 | SA1 |
| 8 | SA2 |
| 9 | SA3 |
| 10 | SA4 |
| 11 | SA5 |
| 12 | TAG0 |
| 13 | TAG1 |
| 14 | TAG2 |
| 15 | TAG3 |
| 16 | TL0 |
| 17 | TL1 |
| 18 | D0 |
| 19 | D1 |
| 20 | D2 |
| 21 | D3 |

| | [15:8] | [7:0] |
|---|---|---|
| 0 | PORT | CTRL |
| 1 | TAG2 | TAG3 |
| 2 | DA0 | DA1 |
| 3 | DA2 | DA3 |
| 4 | DA4 | DA5 |
| 5 | SA0 | SA1 |
| 6 | SA2 | SA3 |
| 7 | SA4 | SA5 |
| 8 | TL0 | TL1 |
| 9 | D0 | D1 |
| 10 | D2 | D3 |

| INDEX | ENTRY |
|---|---|
| INDEX 1 | VPI/VLAN ID-VTRUNK ID- KEY 1a |
| INDEX 2 | VPI/VLAN ID-VTRUNK ID - KEY 2a |
| INDEX 3 | VPI/VLAN ID-VTRUNK ID- KEY 3a |
| ... | ... |
| INDEX N | VPI/VLAN ID-VTRUNK ID - KEY Na |
| INDEX 2a | VPI/VLAN ID-VTRUNK ID - KEY 2b |
| INDEX Na | VPI/VLAN ID-VTRUNK ID |
| INDEX 2b | VPI/VLAN ID-VTRUNK ID - KEY 2c |
| INDEX 3a | VPI/VLAN ID-VTRUNK ID |
| INDEX 1a | VPI/VLAN ID-VTRUNK ID |
| INDEX 2c | VPI/VLAN ID-VTRUNK ID |
| | ... |

INBOUND TAG PRIORITY - VIRTUAL TRUNK ID

| INDEX | ENTRY |
|---|---|
| INDEX 1 | OUTBOUND TAG PRIORITY |
| INDEX 2 | OUTBOUND TAG PRIORITY |
| INDEX 3 | OUTBOUND TAG PRIORITY |
| ... | ... |
| INDEX N | OUTBOUND TAG PRIORITY |

231

OUTBOUND TAG PRIORITY

|   | [15:8] | [7:0] |
|---|--------|-------|
| 0 | PORT | CTRL |
| 1 | TAG2 | TAG3 |
| 2 | DA0 | DA1 |
| 3 | DA2 | DA3 |
| 4 | DA4 | DA5 |
| 5 | SA0 | SA1 |
| 6 | SA2 | SA3 |
| 7 | SA4 | SA5 |
| 8 | TL0 | TL1 |
| 9 | D0 | D1 |
| 10 | D2 | D3 |

|    | [7:0] |
|----|-------|
| 0  | DA0 |
| 1  | DA1 |
| 2  | DA2 |
| 3  | DA3 |
| 4  | DA4 |
| 5  | DA5 |
| 6  | SA0 |
| 7  | SA1 |
| 8  | SA2 |
| 9  | SA3 |
| 10 | SA4 |
| 11 | SA5 |
| 12 | TAG0 |
| 13 | TAG1 |
| 14 | TAG2 |
| 15 | TAG3 |
| 16 | TL0 |
| 17 | TL1 |
| 18 | D0 |
| 19 | D1 |
| 20 | D2 |
| 21 | D3 |

PRIORITY REMAPPING FOR DATA COMMUNICATION SWITCH

BACKGROUND OF THE INVENTION

Standard 802.1Q promulgated by the Institute of Electrical and Electronics Engineers (Std. 802.1Q) entitled "Virtual Bridged Local Area Networks" defines a convention for supporting, among other things, traffic prioritization in bridged local area networks (LANs). The standard includes a convention for instantiating a tag in a packet in the creation of a Std. 802.1Q-compliant packet. The tag may include, among other things, a virtual LAN (VLAN) identifier and a priority. Generally speaking, the VLAN identifier is applied to determine where the packet may be transmitted and the priority is applied to determine how fast the packet will be processed relative to other packets.

As a Std. 802.1Q-compliant packet passes through each bridge in a a network, the convention provides for "regenerating" the tag priority in the packet as received (i.e. the inbound tag priority) and instantiating the regenerated priority in the packet as transmitted (i.e. the outbound tag priority). According to the standard, the outbound tag priority may differ from the inbound tag priority and may be independently determined on each bridge based on the physical port through which the bridge received the packet and the inbound tag priority. There is no provision in the standard, however, to use other values in determining the outbound tag priority. It may be desirable to determine an outbound tag priority based on values other than the inbound tag priority and the receiving physical port.

SUMMARY OF THE INVENTION

The present invention provides priority processing for a data communication switch, such as a LAN switch supporting source-learned bridging, in which a priority for instantiation in a packet is determined based on a priority from the packet and a plurality of other values. The plurality of other values may include a receiving port identifier and a VLAN identifier from the packet. The packet may be a "tagged" packet formatted in compliance with Std. 802.1Q. The plurality of other values may initially be resolved to a virtual trunk identifier, which virtual trunk identifier may be applied with the priority from the packet to determine the priority for instantiation in the packet. The virtual trunk identifier may be resolved by reducing the plurality of other values to a smaller-bit value and using the smaller-bit value in a table look-up.

These and other aspects of the present invention may be better understood by reference to the following detailed description taken in conjunction with the accompanying drawings briefly described below.

DETAILED DESCRIPTION OF THE PREFERRED EMBODIMENT

Figure 1:
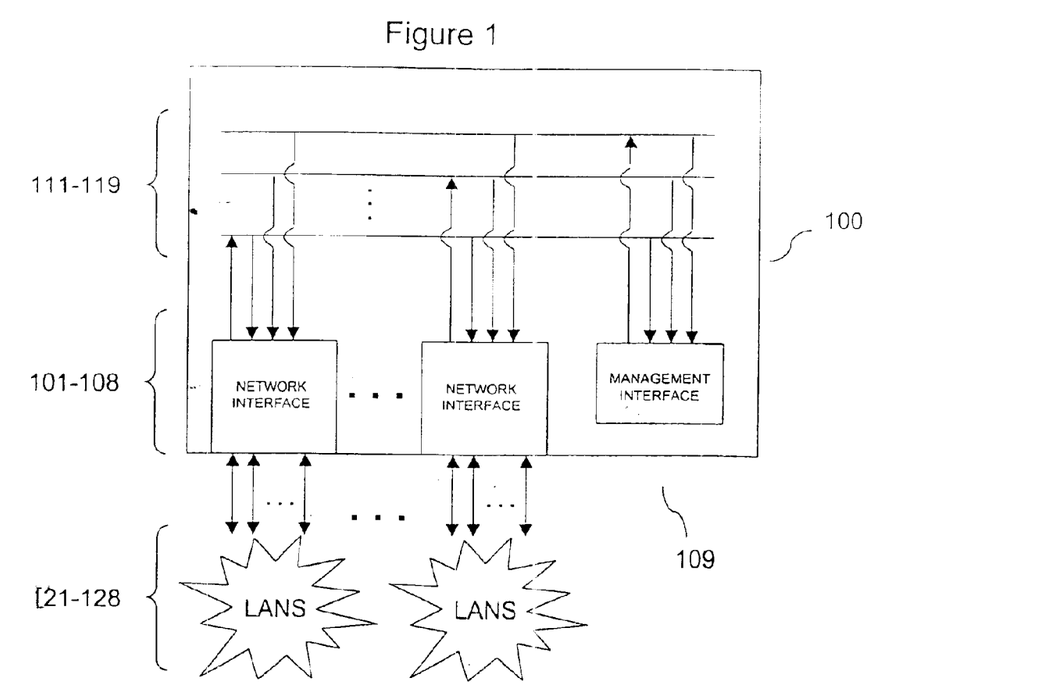
FIG. 1 illustrates a LAN switch.

In FIG. 1, a LAN switch 100 in which the present invention is operative is shown. Switch 100 includes a matrix of packet buses 111–119 driven by interfaces 101–109, respectively. Interfaces 101–109 include network interfaces 101–108 each associated with one or more LANs 121–128, and management interface 109. Each bus has a root interfacing with the one of interfaces 101–109 having the exclusive right to transmit packet data on the bus (i.e. the root interface) and leaves interfacing with the plurality of interfaces 101–109 receiving packet data off the bus (i.e. the leaf interfaces). Preferably, each interface is the root interface on one of buses 111–119 and is a leaf interface on all buses 111–119, including the bus for which it is the root interface. Packets are preferably transmitted on buses 111–119 in a series of constant-bit data bursts at a rate of one burst per clock cycle. Buses 111–119 are broadcast-oriented such that all data bursts propagated on a bus reach all interfaces 101–109. In addition to transmitting and receiving packet data, management interface 109 serves as the "nerve center" of switch 100 which assists network interfaces 101–108 in learning the addresses of network devices on their associated LANs 121–128 by transmitting information on management bus (not shown). Of course, the root-to-leaf architecture described above is one of many possible architectures for a switch operative in accordance with the present invention. Other possible architectures may have a single common bus between interfaces or "full mesh" matrix of point-to-point connections between interfaces.

In one basic operation, switch 100 supports a source-learned bridging function. By way of example, a packet originates on a network device (not shown) residing on one of LAN's 121 associated with network interface 101. The packet includes a source address of the originating network device and, if the packet is a unicast packet, a destination address of the network device for which the communication is intended. Layer 2 (Data Link) addresses, such as Media Access Control (MAC) addresses are contemplated. The packet arrives at interface 101 due to the broadcast nature of the LAN. If the packet's source address is not recognized on interface 101, the packet is submitted to management controller 109 for a learning operation which results in the address being "learned" on interface 101, i.e. being added to a list of addresses active on interface 101. Thereafter, interface 101 recognizes any packets received off packet buses 111–119 having the learned address as a destination address as being destined for a network device on one of LAN's 121 and captures such packets for forwarding.

The destination address check performed on packets received off packet buses 101–109 is often called a "filtering" check since packets not having as a destination address an address learned by interface 101 are dropped, or "filtered", by interface 101, subject to certain exceptions. Filtering checks are conducted individually by interfaces 101–109 on each packet received off buses 111–119. The decision of whether to forward or filter a packet is generally made based on whether the packet contains a destination address previously learned by the interface, as described above. However, interfaces 101–109 share the results of such determinations to avoid filtering packets whose destination address has not been learned by any interface. Such "unknown destination" packets are captured by all interfaces. More particularly, in an exemplary filtering check, an interface applies the following filtering rules:

1. If the packet has a destination address previously learned by the interface, the filtering check is passed. The packet is captured.
2. If the packet has a destination address not previously learned by the interface, and the destination address has been previously learned by another interface, the filtering check is failed. The packet is filtered.
3. If the packet has a destination address not previously learned by the interface, and the destination address has not been previously learned by another interface, the filtering check is passed. The packet is captured.

Interfaces 101–109 preferably assert claim lines (not shown) to notify each other about decisions to capture packets.

Beyond supporting the sourced-learned bridging function just described, switch 100 supports a priority processing to which the present invention is primarily addressed. The priority processing is contemplated for use in connection with packets having a tag priority associated therewith, such as Ethernet packets compliant with Std. 802.1 Q.

Figure 2:
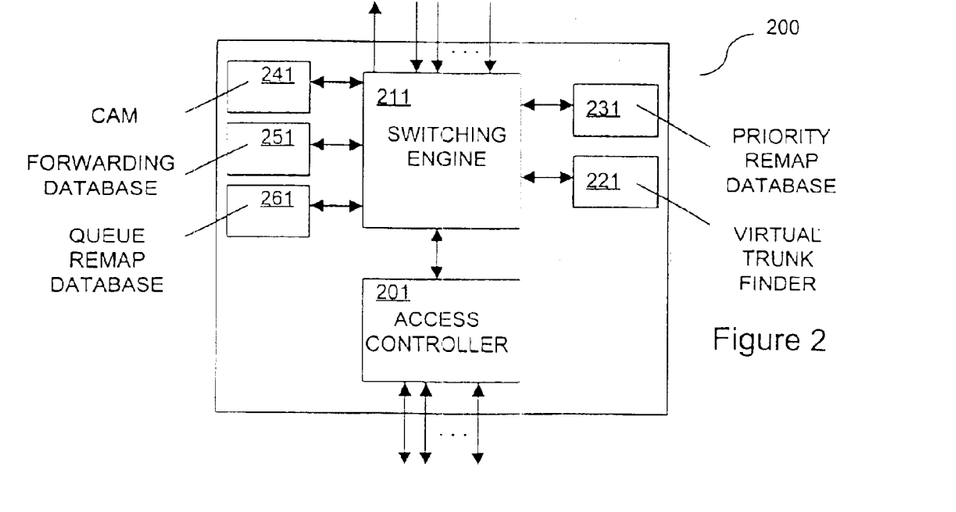
FIG. 2 illustrates a representative network interface within the LAN switch of FIG. 1.

Turning to FIG. 2, a preferred priority processing will now be described by reference to network interface 200, which is representative of network interfaces 101–108. Interface 200 includes access controller 201 coupled to LANs and switching engine 211. Controller 201 receives packets off LANs, formats them and transmits them to engine 211. Controller 201 also receives packets from engine 211, formats them and transmits them on LANs. Engine 211 is coupled to Elements for facilitating priority processing, including virtual trunk finder 221, priority remap database 231, content-addressable memory (CAM) 241, forwarding database 251 and queue remap database 261. Particularly, engine 211 receives packets from controller 201, subjects them to ingress priority processing and transmits them on the one of buses 111–119 for which interface 200 is the root. Engine 211 also receives packets from buses 111–119, subjects selected ones of them to egress priority processing and transmits selected ones of them to controller 201. Ingress priority processing is conducted with the assistance of virtual trunk finder 221, priority remap database 231, CAM 241 and forwarding database 251, while egress priority processing is conducted with the assistance of CAM 241, forwarding database 251 and queue remap database 261.

Figure 3:
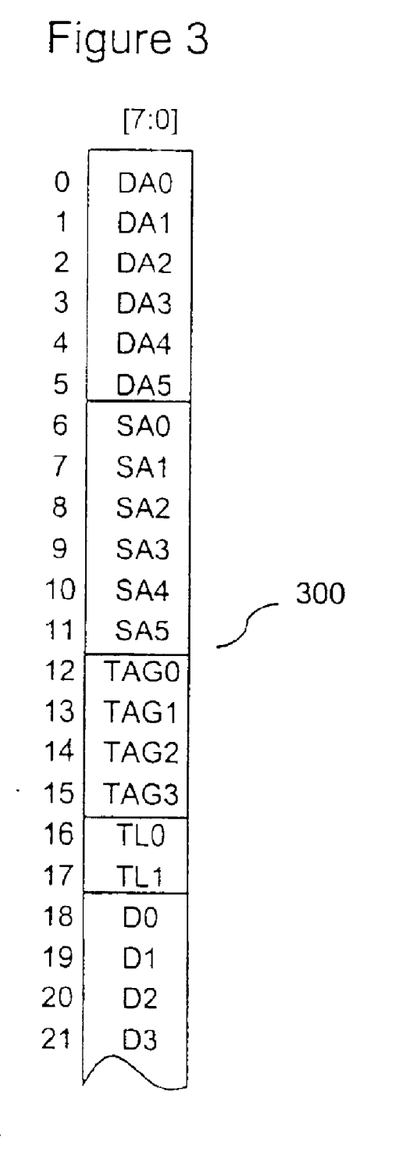
FIG. 3 illustrates a packet as received at the access controller within the network interface of FIG. 2 from a LAN.

In FIGS. 3 through 16, the priority processing supported in switch 100 is described in even greater detail by reference to a Std. 802.1Q-compliant Ethernet packet (hereinafter "tagged" packet) in the format received at interface 200 from one of LANs. Referring first to FIG. 3, the inbound packet 300 includes a destination MAC address (DA0–DA5) followed by a source MAC address (SA0–SA5), a tag (TAG0–TAG3) and type-length information (TL0 and TL1), respectively. The type-length information is followed by additional information, which typically includes an Internet Protocol (IP) header, and of which the first four bytes are shown as D0–D3.

Figure 4:
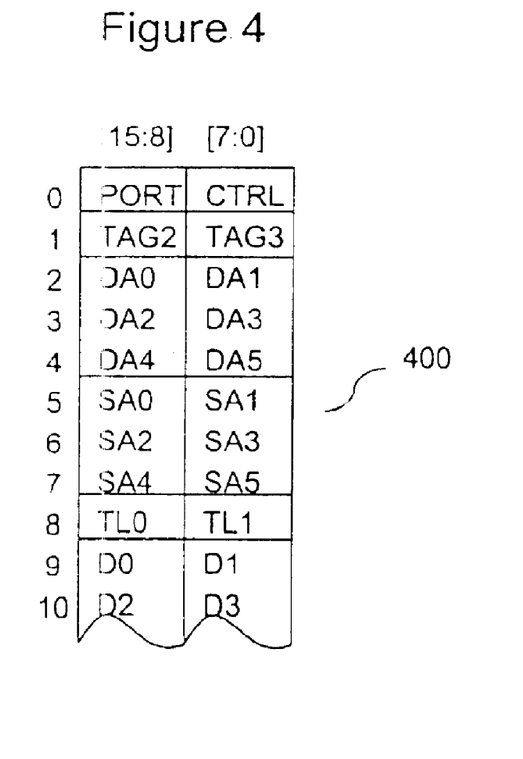
FIG. 4 illustrates a packet as received at the switching engine within the network interface of FIG. 2 from the access controller of FIG. 2.

At access controller 201, inbound packet 300 is identified as a tagged packet and is placed in an ingress processing-ready format and transmitted to switching engine 211. Identification as a tagged packet is made by reference to a portion of the tag (TAG0 and TAG1), which has the value x8100 if the packet is a tagged packet, as defined in the IEEE 802.1Q standard. Ingress-ready packet 400 is shown in FIG. 4 in two-byte widths to reflect that, in the illustrated embodiment, packet 400 is transmitted from controller 201 to engine 211 in two-byte bursts. However, it will be appreciated that transmission may occur in different widths in other embodiments. Packet 400 includes a physical port identifier (PORT), which identifies the physical port through which inbound packet 300 was received, followed by control information (CTRL), which Identifies packet 400 as a tagged packet. CTRL is followed by a portion of the tag (TAG2 and TAG3), which has tag control information (TCI) as defined in Std. 802.1Q. More particularly, TCI includes a three-bit inbound tag priority, a one bit canonical format indicator and a twelve-bit VLAN identifier. The remainder of packet 400 is formatted as in inbound packet 300. It bears noting that where an inbound packet is untagged, CTRL indicates this condition in the corresponding ingress-ready packet and no TCI is appended to such packet.

At switching engine 211, packet 400 is subjected to ingress priority processing to prepare packet 400 for transmission on the bus for which interface 200 is the root. Engine 211 identifies packet 400 as a tagged packet by reference to CTRL. Once identified, engine 211 strips PORT, CTRL and TAG2 and TAG 3 (including the twelve-bit VLAN identifier therein) from packet 400. PORT is remapped to an eight-bit virtual port identifier (VPI) unique on switch 100. In this regard, it will be appreciated that two or more of network interfaces 101–108 may have a physical port represented by the same physical port identifier, and that remapping PORT in packet 400 to a VPI advantageously resolves any potential ambiguities. VPI and the twelve-bit VLAN identifier are submitted as a pair to virtual trunk finder 221 on input lines 511 and 512, respectively.

Figures 5, 6:
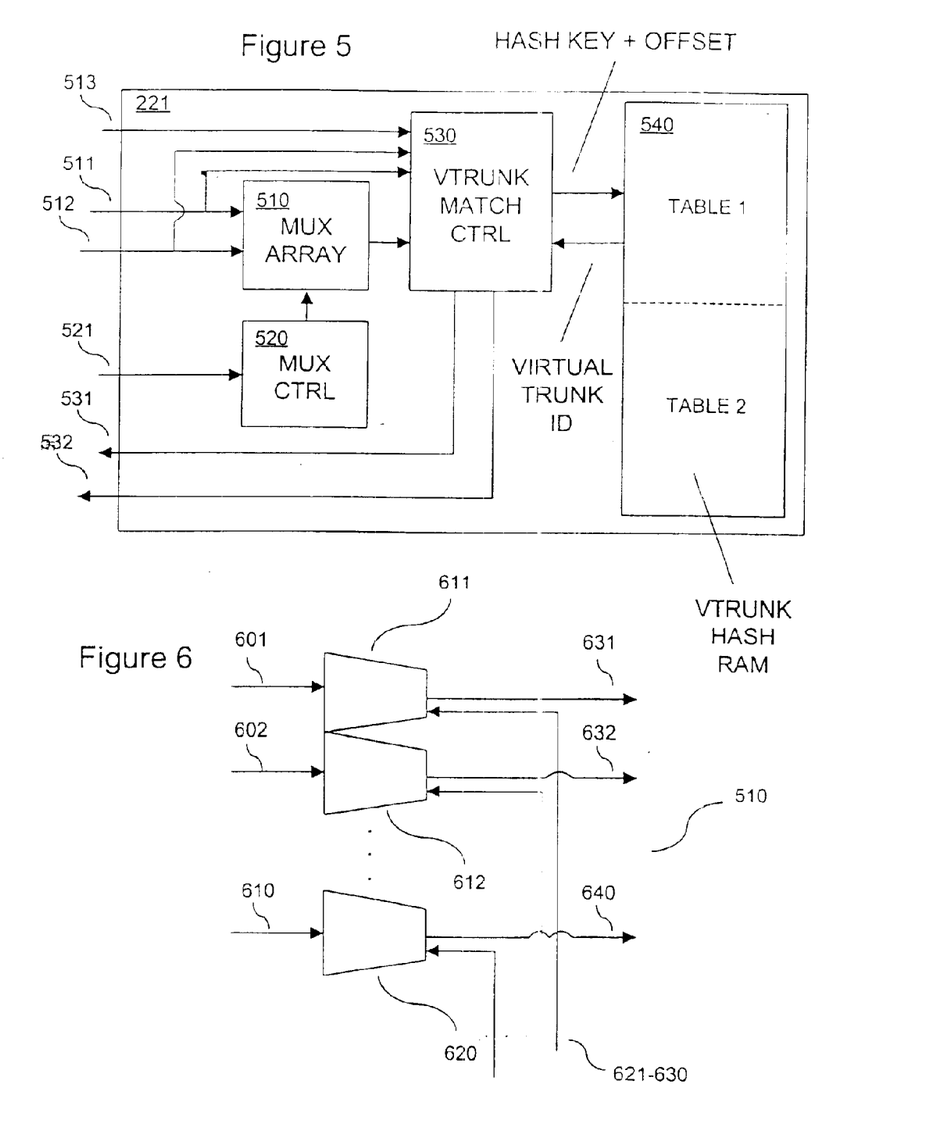
FIG. 5 illustrates the virtual trunk finder within the network interface of FIG. 2.
FIG. 6 illustrates the multiplexor array within the virtual trunk finder of FIG. 5.

At virtual trunk finder 221, the twenty-bit VP/VLAN identifier pair is reduced to a ten-bit hash key used for resolving a virtual trunk identifier (VTI). It will be appreciated that this reduction reduces the size of the RAM required to implement an index-based look-up scheme to resolve an identifier, such as that described herein to resolve VTIs. Turning to FIGS. 5 and 6, the VPI/VLAN pair transmitted by engine 211 is received in multiplexor array 510. Array 510 is an array of staggered multiplexors 611–620 for reducing the VPI/VLAN pair to a hash key including the bits from bit positions in the VPI/VLAN pair that a hashing algorithm has determined will be the most effective at distinguishing different VPI/VLAN pairs from one another. The VPI/VLAN pair is parsed into different subsets for receipt by multiplexors 611–620 on input lines 601–610, respectively. The subsets transmitted by different ones of input lines 601–610 are staggered such that multiplexors 611–620 in the aggregate may select the hash key from any ten-bit combination in the VPI/VLAN pair in accordance with bit select commands applied to the array 510. Thus, for instance, input line 601 may transmit bits zero through twelve of the VPI/VLAN pair, input line 602 may transmit bits one through thirteen, input line 603 may transmit bits two through fourteen, and so on. With the assistance of multiplexor control 520 each of multiplexors 611–620 selects a single bit from its associated one of input lines 601–610 and transmits only the selected bit. Optionally, multiplexor control 520 may cause one or more of multiplexors 611–620 to ignore all bits on its associated one of input lines 601–610 and automatically select a value of zero. The selected bits of the VPI/VLAN pair and any zero values are transmitted on output lines 631–640, and together form the hash key.

Multiplexor bit selection is directed by multiplexor control 520. Control 520 includes a memory element for storing a hash mask, and associated logic. The hash mask is advantageously programmed and updated on input line 521. Values for the hash mask are calculated by a hashing algorithm such that any VPI/VLAN pair received by array 510 may be reduced to a hash key including the bits from bit positions that the hashing algorithm has deemed the most effective at distinguishing VPI/VLAN pairs from one another. To facilitate selection, control 520 is coupled to multiplexors 611–620 via mask lines 631–640. Control 520 determines bit select commands for each one of multiplexors 611–620 from the hash mask and transmits the bits select commands on mask lines 631–640. Each bit select command is sufficient to identify a single bit of the VPI/VLAN pair, if any, each one of multiplexors 611–620 is to select for inclusion in the hash key. Thus, for example, bit select command received by multiplexor 611 on line 631 may instruct multiplexor 611 to select one of bits zero through twelve of the VPI/VLAN pair, if any, for inclusion in the hash key; bit select command received by multiplexor 612 on line 632 may instruct multiplexor 612 to select one of bits one through thirteen, if any, for inclusion in the hash key; and so on. The hash key is transmitted to virtual trunk match control 530 along with an offset transmitted on input line 531, which together form a pointer to virtual trunk hash random access memory (RAM) 540. In this regard, hash RAM 540 includes two tables (Table 1 and Table 2), one of which is selected at any given time in accordance with the offset.

Figure 7:
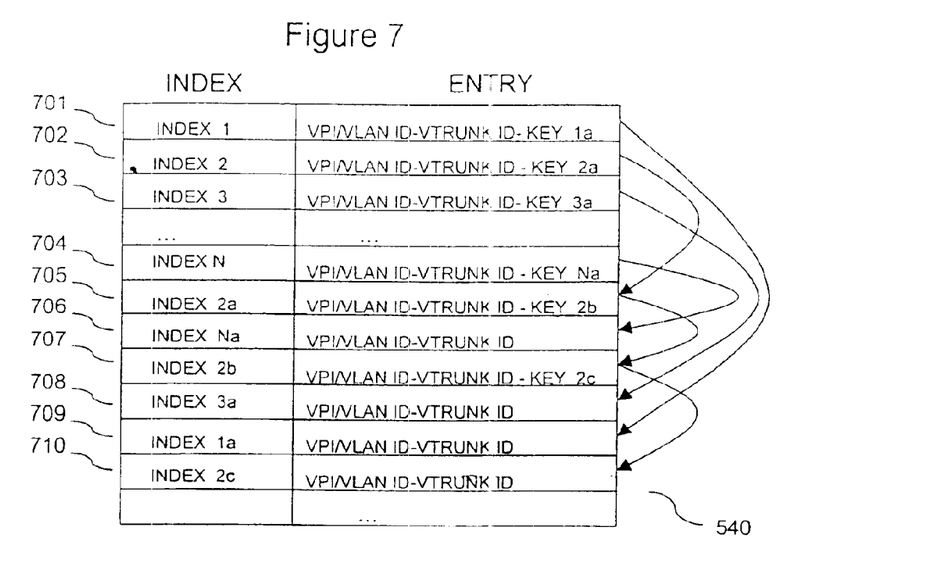
FIG. 7 illustrates the virtual trunk hash RAM within the virtual trunk finder of FIG. 5.

The twenty-bit VPI/VLAN pair is also received in virtual trunk match control 530 for use as a comparand in an associative comparison with one or more VPI/VLAN pairs returned from hash RAM 540 in a manner now described in greater detail. Referring to FIG. 7, match control 530 interfaces with hash RAM 540 to perform associative comparisons using the pointer formed from the hash key and offset. The pointer is used as the initial pointer to hash RAM 540 to retrieve the contents of the entry associated with the index whose value matches the pointer. The pointer is operative to instigate a walk-through a linked list of entries within the table that continues until either a match for the VPI/VLAN pair is found or the end of the linked list is reached. More particularly, table 700 includes entry contents at corresponding indices. Entry contents include, for each entry, a VPI/VLAN pair, a VTI and a "next entry" key, if any. In the illustrated example, table 700 includes N entry subsets forming N linked lists, or "buckets". The first bucket includes indices 701 and 709. The second bucket includes indices 702, 705, 707 and 710. The third bucket includes indices 703 and 708. The Nth bucket includes indices 704 and 706. If a pointer points, for instance, to index 702 and the VPI/VLAN pair from the corresponding entry does not match the VPI/VLAN pair in match control 530, the "next entry" key from the entry (identifying index 705) is used as a pointer to index 705. If the pair returned from the entry corresponding to index 705 does not match, the "next entry" key from the entry (identifying index 907) is used as a pointer to index set 707. Match control 530 continues this walk through hash RAM 120 until a match is found. Match control 530 returns the VTI associated with the matching entry to match control 530 for forwarding to switching engine 211 on output line 531.

Virtual trunk match control 530 also tracks performance of the hashing algorithm and notifies an external processor (not shown) on output line 532 whenever performance has sufficiently deteriorated. Particularly, control 530 increments a value within a memory for each failed attempt to match the VPI/VLAN pair returned from hash RAM 540 with the comparand. When performance has deteriorated beyond a minimum performance standard, control 530 transmits a failure notice to the processor on output line 532 causing the processor to recalculate the hashing algorithm and update the hash mask on input line 521. Various minimum performance standards may be implemented, based on considerations such as the aggregate number of failed attempts, the highest number of failed attempts for a particular walk-through, the average number of failed attempts per walk-through or the frequency with which a number of failed attempts has been surpassed. The minimum performance standard is configurable on match control 530. It will be appreciated that whenever the hash mask is changed, the entries in hash RAM 540 must be rewritten to new indexed locations. Entry rewrites may be conducted with minimal impact on performance by using one table for look-ups while rewriting the other, and granting look-ups priority over rewrites for purposes of accessing hash RAM 540.

Figure 8:
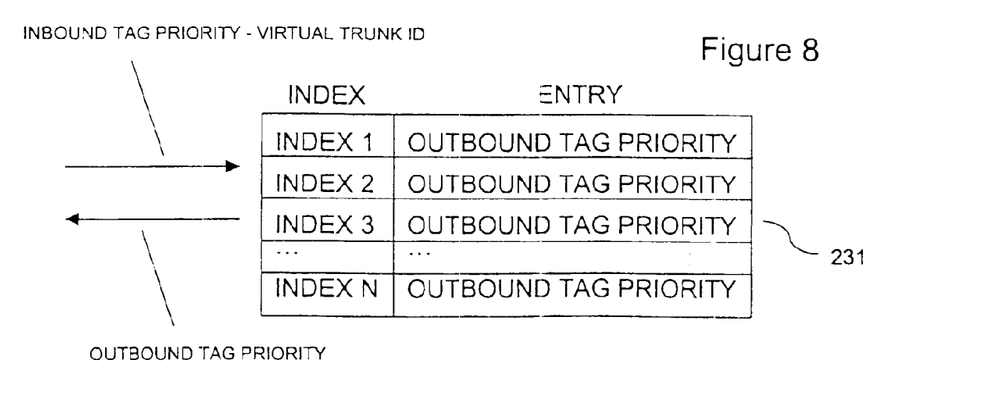
FIG. 8 illustrates the priority remap database within the network interface of FIG. 2.

Referring now to FIG. 8, priority remap database 231 is illustrated in greater detail. Database 231 determines an outbound tag priority for ingress-ready packet 400 based on the inbound tag priority and the resolved VTI. Particularly, switching engine 211 submits the inbound tag priority of packet 400 and VTI received from virtual trunk finder 221 to database 231. The inbound tag priority and VTI are used as a pointer to a corresponding index in database 231, which returns an outbound tag priority.

Figure 9:
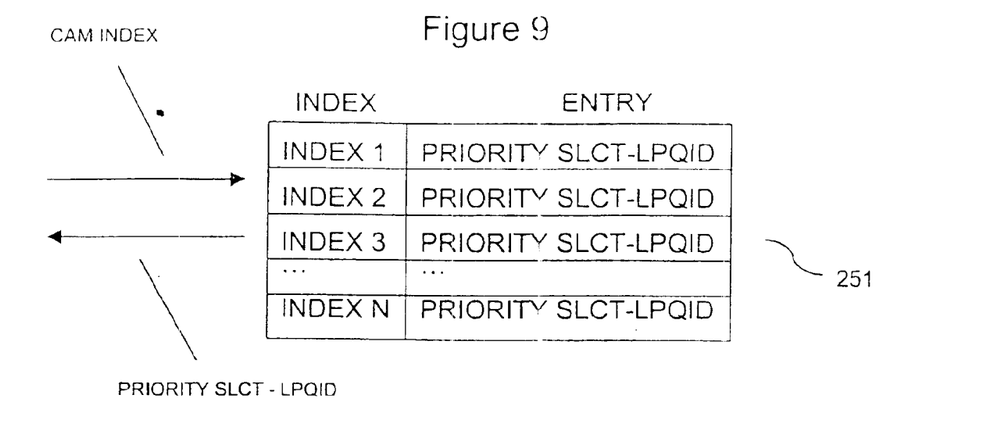
FIG. 9 illustrates the forwarding database within the network interface of FIG. 2.

Independently of the outbound tag priority determination conducted in priority remap database 231, switching engine 211 consults CAM 241 and forwarding database 251 to make a priority selection for packet 400. Returning to FIG. 2, CAM 241 has entries holding, at different CAM indices, learned addresses of network devices residing on the LANs associated with interface 200. Forwarding database 251 maintains entries that are linked to these entries in CAM 241 through a common index. The source address in packet 400 is submitted to CAM 241, which returns the CAM index at which the source address resides (hereinafter source CAM index, or SCI). Referring to FIG. 9, SCI is used as a pointer to the linked entry in database 251 to retrieve forwarding data, including a priority selection indicator for packet 400, which is returned to engine 211. Priority selection indicator determines whether or not packet 400 will be afforded a quality of service in switch 100 in relation to its tag priority, as will be hereinafter explained in more detail. Database 251 is shown to include priority selection indicator and local priority queue identifiers at particular indices. Local priority queue identifiers are not involved in the ingress priority processing under present discussion but are advantageously implemented in the egress priority-based processing, which is discussed hereinafter. It bears noting that if the source address in packet 400 has not yet been learned, no valid SCI is returned from CAM 241 and VTI returned from virtual trunk finder 221 may be used instead to index another database (not shown) to make a priority selection for packet 400.

Figure 10:
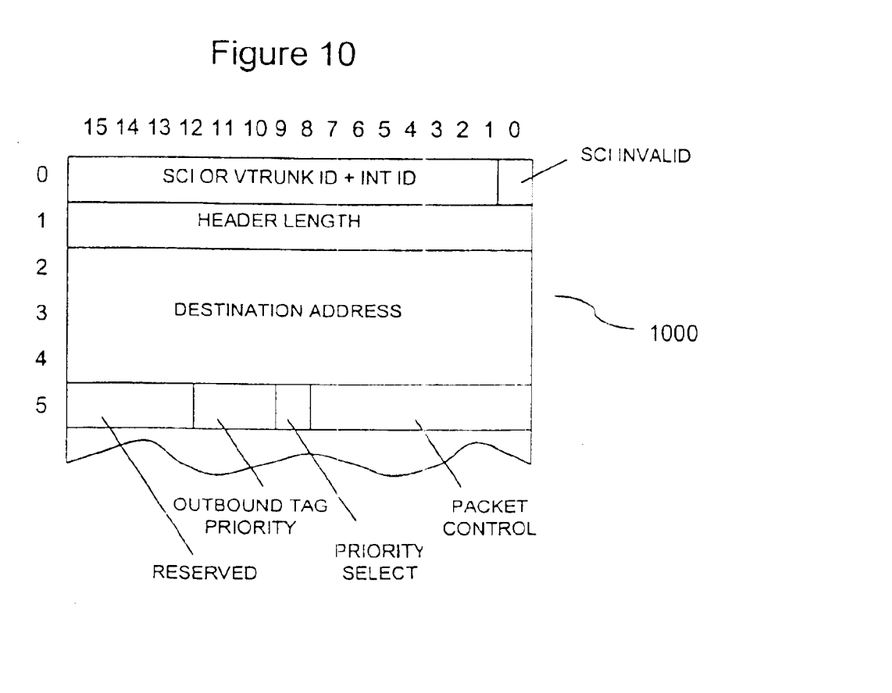
FIG. 10 illustrates a local header of a packet as received at the switching engine operative within the network interface of FIG. 2 from a backplane bus.

Switching engine 211 appends a local packet header to ingress-ready packet 400 (less PORT, CTRL AND TAG2 and TAG3, which were previously stripped) to place the packet in an egress-ready format. Turning to FIG. 10, local packet header 1000 of the egress-ready packet is shown. Header 1000 includes SCI or, if a valid SCI was not returned from CAM 241, VTI and an interface identifier sufficient to identify VTI as originating from interface 200. In this regard, it will be appreciated that two or more of network interfaces 101–108 may have a VPI/VLAN pair represented by the same VTI, and that the additional bits advantageously resolve any potential ambiguities. Header 1000 further includes an "invalid SCI" indicator identifying whether or not a valid SCI was returned. Particularly, if the "invalid SCI" indicator is set, the egress-ready packet will be captured by management interface 109 and undergo "source learning" resulting in the source address being added to CAM 241. Header 1000 also includes the outbound tag priority returned from priority remap database 231, the priority select indicator returned from forwarding database 251 (or from the VTI look-up, if CAM 241 did not return a valid SCI), as well as header length information, a destination address and packet control information. The egress-ready packet is transmitted on the bus for which interface 200 is the root, marking the completion of ingress priority-based processing.

To this point in the discussion, an ingress priority processing has been described; in which an outbound tag priority for a packet is determined based on an inbound tag priority and a plurality of other values and is applied to the packet; and in which a priority selection indicator for a packet is determined and applied to the packet, which indicator determines whether the packet will be prioritized in the switch based on its tag priority. There will be other and further advances over conventional approaches to priority processing described herein; nonetheless, the ingress priority processing described to this point is believed to represent a significant advance over the prior art.

Representative network interface 200 will now be referenced to describe egress priority processing of the egress-ready packet. To avoid unnecessary complication, it will be assumed that interface 200 is the one of network interfaces 101–108 associated with the LAN on which is resident the network device for which the egress-ready packet is destined, and that the network device that originated the packet is authorized to communicate with the network device to which the packet is destined. Aspects of egress processing which test these assumptions, such as an authorization check utilizing the SCI component of header 1000, will therefore not be described in any greater detail. Switching engine 211 strips header 1000 from the packet, consults CAM 241 and forwarding database 251 to determine whether the destination address in header 1000 is recognized and determines a local priority queue identifier (LPQID) therefor. As noted above, CAM 241 has entries holding, at different CAM indices, learned addresses of network devices residing on LANs associated with interface 200. Because the destination address is recognized in the example under consideration, CAM 241 returns the CAM index at which the destination address resides (hereinafter destination CAM index, or DCI). Returning to FIG. 9, DCI is used as a pointer to the linked entry in forwarding database 251 to retrieve forwarding data, including LPQID for the packet, which is returned to engine 211. LPQID is "local" in the sense that it is determined by switch 100 without reference to any tag priority. LPQID thus provides a capability for prioritizing the egress-ready packet, particularly in regard to scheduling its release from interface 200 relative to other packets, which is independent of its tag priority. The decision as to whether prioritization is to be effectuated in accordance with tag priority or independent of tagpriority is made by reference to the priority selection indicator and will now be explained in more detail.

Figure 11:
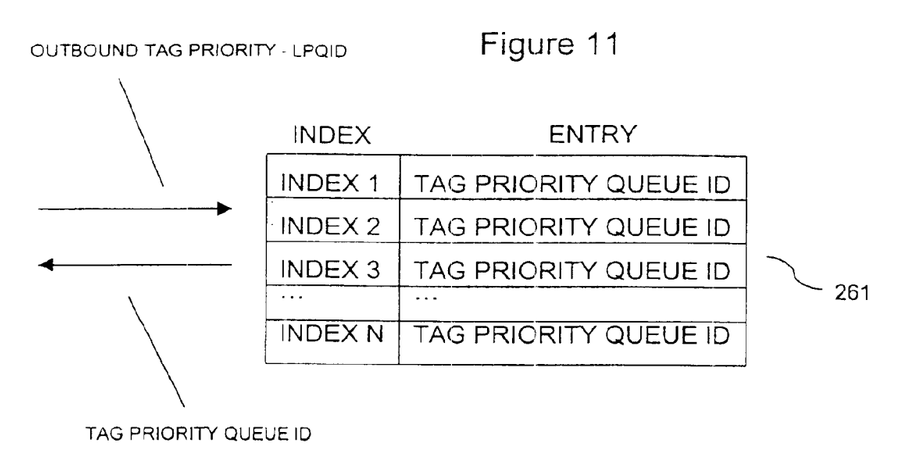
FIG. 11 illustrates the queue remap database within the network interface of FIG. 2.

Switching engine 211 consults the priority selection indicator from header 1000 to determine whether or not the egress-ready packet should be afforded a tag-based prioritization. If the priority selection indicator indicates that the packet should not be afforded a tag-based prioritization, the packet (as reformatted) is queued in the priority queue specified by LPQID for release to access controller 201 in accordance with a priority-based scheduling algorithm. If, however, priority selection indicator indicates that the packet should be afforded a tag-based prioritzation, engine 211 engages queue remap database 261 to determine a tag priority queue identifier (TPQID). Referring now to FIG. 11, database 261 is illustrated in greater detail. Database 261 determines a TPQID for the packet based on the outbound tag priority and the LPQID. Particularly, engine 211 submits to queue remap database 261 the outbound tag priority from header 1000 and LPQID resolved from forwarding database 251. The outbound tag priority and LPQID are used as a pointer to a corresponding index in database 261, which returns TPQID. TPQID is returned to engine 211 and the packet (as reformatted) is queued in the priority queue specified by TPQID for release to access controller 201 in accordance with a priority-based scheduling algorithm.

Figure 12:
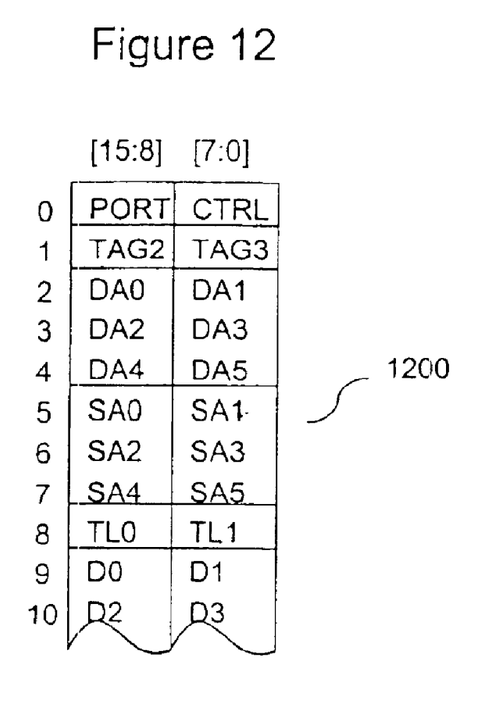
FIG. 12 illustrates a packet as received at the access controller within the network interface of FIG. 2 from the switching engine of FIG. 2.
Figure 13:
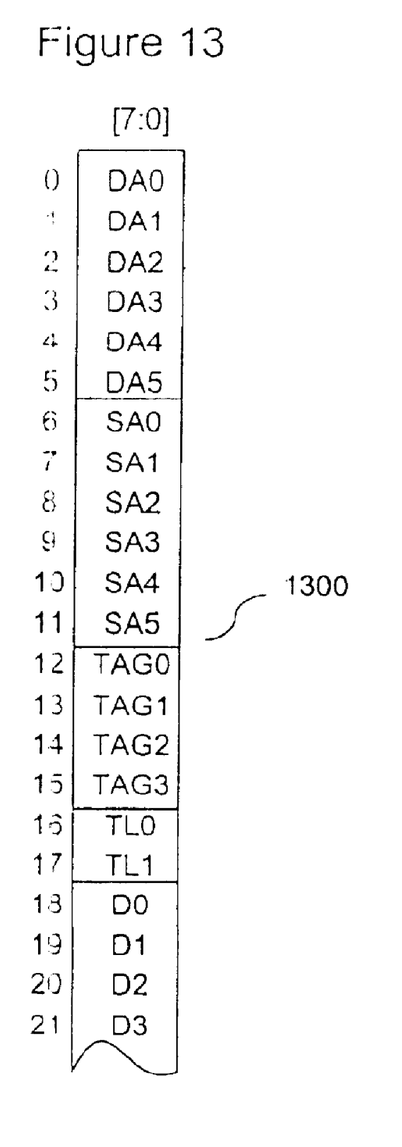
FIG. 13 illustrates a packet as transmitted by the access controller within the network interface of FIG. 2 to a LAN.

Referring to FIG. 12, the format in which the packet is transmitted by engine 211 to access controller 201 is shown. Packet 1200 includes a physical port identifier (PORT) identifying the physical port through which the outbound packet will be transmitted, followed by control information (CTRL), which identifies packet 1200 as a tagged packet. CTRL is followed by a portion of the tag (TAG2 and TAG3) having TCI including the outbound tag priority. Packet 1200 also has destination address (DA0–DA5), source address (SA0–SA5), type-length information (TL0–TL1) and other information. At access controller 201, packet 1200 is identified as a tagged packet by reference to CTRL. Once identified as a tagged packet, controller 201 strips PORT, CTRL and TAG2 and TAG 3 from packet 1200 and applies the complete tag (TAG0–TAG3) to the position indicated by the IEEE 802.1Q standard to generate outbound packet 1300. Packet 1300 is transmitted by controller 201 to the one of LANs 121 on the physical port indicated by PORT.

Figure 14:
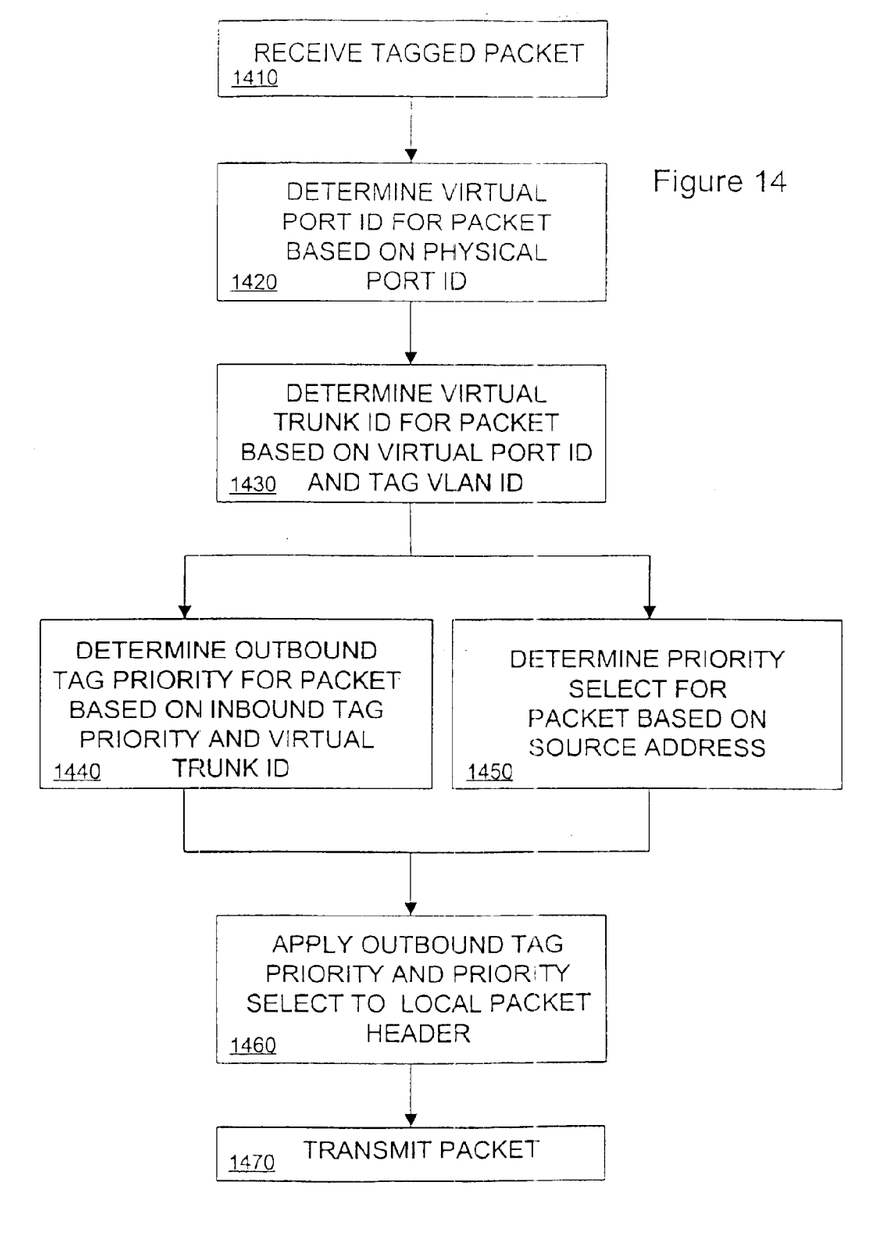
FIG. 14 is a flow diagram describing ingress priority processing in accordance with a preferred embodiment of the present invention.

In FIG. 14, ingress priority processing is described by reference to a flow diagram. A tagged packet is received on a physical port of switch 100 (1410) and a virtual port identifier is determined based on an identifier associated with the physical port (1420). Based on the virtual port identifier and the VLAN identifier component of the inbound tag a virtual trunk identifier is determined (1430). The virtual trunk identifier and the priority component of the inbound tag are used to determine an outbound tag priority (1440) and, separately, a source address of the inbound packet is used to make a priority selection (1450). The priority selection indicator and the outbound tag priority are applied to a local header of the packet (1460) and the packet is transmitted (1470).

Figure 15:
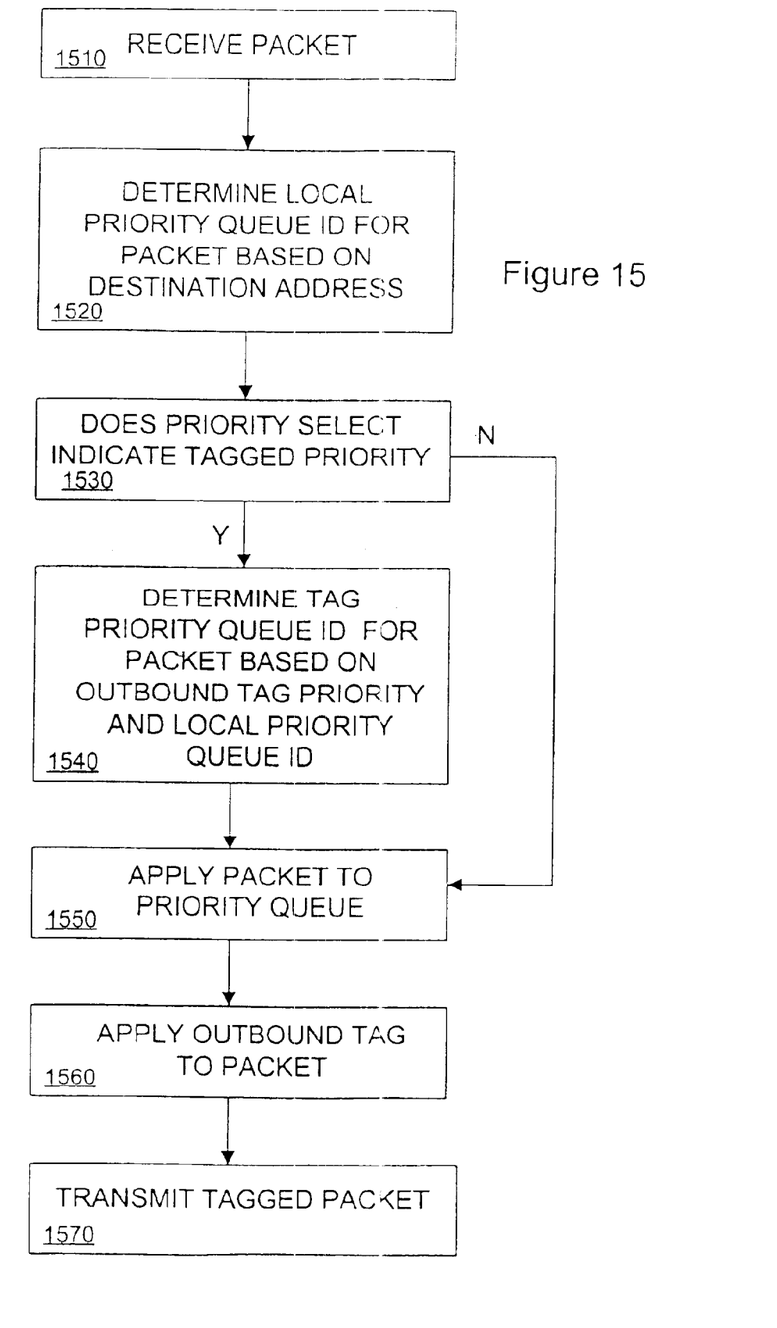
FIG. 15 is a flow diagram describing egress priority processing in accordance with a preferred embodiment of the present invention.

In FIG. 15, egress priority processing is described by reference to a flow diagram. An ingress-processed packet is received (1510) and a local priority queue identifier is determined based on a destination address of the packet (1520). The priority selection indicator of the packet is reviewed to determine whether or not the packet is to be prioritized based on its tagged priority (1530). If the answer is in the negative, the packet is applied to a priority queue based on the local priority queue identifier (1550). If the answer is in the affirmative, however, a tag priority queue identifier is determined based on the local priority queue identifier and the outbound tag priority (1540) and the packet is applied to a priority queue based on the tag priority queue identifier (1550). In either event, an outbound tag is applied to the packet (1560), including the outbound tag priority, and the packet is transmitted from switch 100 (1570).

A priority processing has therefore been described in which a tagged packet may be provided on a switch either (i) a local prioritization independent of tag priority or (ii) a tagged prioritization dependent on tag priority. Moreover, a priority-based processing has been described in which an outbound tag priority may be preserved for transmission in an outbound tagged packet regardless of whether the outbound tag priority is applied on the switch to effectuate prioritization. These attributes are believed to represent additional significant advances over the prior art.

It will be appreciated by those of ordinary skill in the art that the invention can be embodied in other specific forms without departing from the spirit or essential character hereof. The present description is therefore considered in all respects illustrative and not restrictive. The scope of the invention is indicated by the appended claims, and all changes that come within the meaning and range of equivalents thereof are intended to be embraced therein.

I claim:

1. A method for remapping packet priority in a data communication switch having a plurality of ports, comprising:

receiving a packet including a first priority value on a first port;

determining a virtual trunk value based on a plurality of values, the plurality of values including a VLAN identifier;

determining a second priority value based on the first priority value and the virtual trunk value; and transmitting the packet including the second priority value on a second port.

2. The method according to claim 1, wherein the plurality of values includes an identifier of the first port.

3. The method according to claim 1, wherein the VLAN identifier is included in the packet as received.

4. The method according to claim 1, wherein the step of determining the virtual trunk value includes reducing the plurality of values to a smaller-bit value and using the smaller-bit value in a table look-up.

5. A method for remapping packet priority in a data communication switch having a plurality of ports, comprising:

receiving a packet including a first priority value on a first port;

determining a second priority value based on the first priority value and a plurality of other values including an identifier of the first port and a VLAN identifier; and transmitting the packet including the second priority value on a second port.

6. The method according to claim 5, wherein the VLAN identifier is included in the packet as received.

7. A network interface for a data communication switch, comprising:

an access controller having a port for receiving a packet including a first priority value; and a switching engine coupled to the access controller for receiving the packet from the access controller, for transmitting a plurality of values including a VLAN identifier to a first element in response to the packet, for receiving a virtual trunk identifier from the first element in response to the plurality of values including the VLAN identifier, for transmitting the virtual trunk identifier and the first priority value to a second element, for receiving a second priority value from the second element in response to the virtual trunk identifier and the first priority value and for transmitting the packet including the second priority value.

8. The network interface according to claim 7, wherein the plurality of values includes an identifier of the port.

9. The network interface according to claim 7, wherein the packet as received at the access controller includes a VLAN identifier.

10. A network interface for a data communication switch, comprising:

an access controller having a port for receiving a packet including a first priority value and a VLAN identifier; and a switching engine coupled to the access controller for receiving the packet from the access controller, for consulting a plurality of databases to resolve a second priority value from a plurality of values including an identifier of the port, the VLAN identifier and the first priority value and for transmitting the packet including the second priority value.

11. The network interface of claim 10, wherein the identifier of the port is a virtual port identifier derived from a physical port identifier.

* * * * *